United States Patent [19]

Nagler et al.

[11] Patent Number: 5,099,498
[45] Date of Patent: Mar. 24, 1992

[54] METHOD FOR SUPPRESSING QUANTIZATION NOISES SUPERIMPOSED ON A SINUSOIDAL AUDIBLE TONE TRANSMITTED IN A DIGITAL TELECOMMUNICATIONS EXCHANGE SYSTEM

[75] Inventors: Werner Nagler; Hans-Werner Rudolf, both of Munich; Monika Stadler, Hausham, all of Fed. Rep. of Germany

[73] Assignee: Siemens Aktiengesellschaft, Munich

[21] Appl. No.: 368,948

[22] Filed: Jun. 14, 1989

Related U.S. Application Data

[63] Continuation of Ser. No. 533,950, Sep. 20, 1983, abandoned.

[30] Foreign Application Priority Data

Sep. 28, 1982 [DE] Fed. Rep. of Germany ....... 3235881

[51] Int. Cl.$^5$ ............................................. H03K 3/013
[52] U.S. Cl. ........................................ 375/26; 379/361

[58] Field of Search ............... 379/235, 237, 361, 418; 370/110.1, 110.2; 375/26, 34; 331/76; 328/14, 16; 340/825.44, 825.71; 364/721, 851; 341/147; 381/73.1

[56] References Cited

U.S. PATENT DOCUMENTS

| | | | |
|---|---|---|---|
| 3,999,129 | 12/1976 | Kasson | 375/26 |
| 4,171,466 | 10/1979 | Carbrey | 370/110.2 |
| 4,390,754 | 6/1983 | Holberg | 379/361 |
| 4,399,535 | 8/1983 | Southard | 379/361 |
| 4,476,572 | 10/1984 | Horrall et al. | 381/73.1 |

*Primary Examiner*—Benedict V. Safourek
*Attorney, Agent, or Firm*—Hill, Van Santen, Steadman & Simpson

[57] ABSTRACT

A harmonic tone having an amplitude which is significantly lower than a fundamental audible tone is superimposed on the audible tone to drown out quantization noises for audible tones transmitted in digital telecommunications exchange systems.

4 Claims, 1 Drawing Sheet

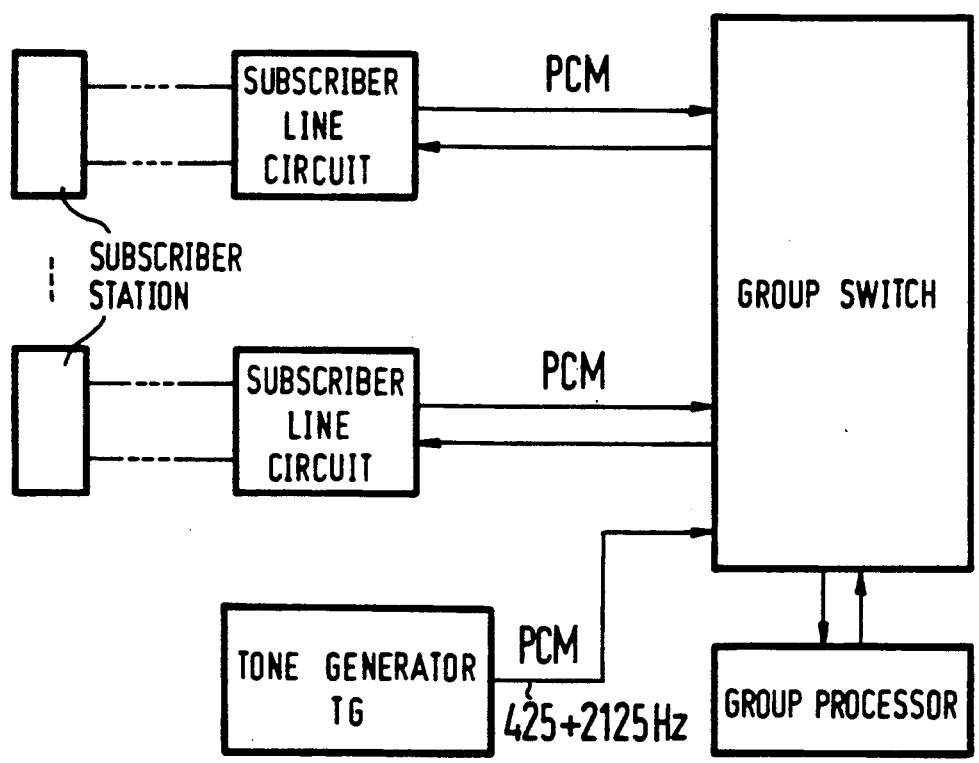

METHOD FOR SUPPRESSING QUANTIZATION NOISES SUPERIMPOSED ON A SINUSOIDAL AUDIBLE TONE TRANSMITTED IN A DIGITAL TELECOMMUNICATIONS EXCHANGE SYSTEM

This is a continuation of application Ser. No. 533,950 filed Sept. 20, 1983, now abandoned.

BACKGROUND OF THE INVENTION

1. Field of the Invention

The present invention relates to a method for suppressing quantization noises which are superimposed on an audible tone having a sinusoidal waveform upon transmission thereof in a digital telecommunications exchange system.

2. Description of the Prior Art

Upon transmission of speech signals in digital exchange systems which are based, for example, on a sampling frequency of 8 kHz, coded samples are transmitted at time intervals of, respectively, 125,μsec. Since the sampling frequency is not a whole multiple for the frequency of the audible tones normally employed, quantization noises arise, these being particularly attributable to the common subharmonics of the audible frequency and the sampling frequency appearing with relatively high amplitudes. These common subharmonics, as well as their upper harmonic waves, are distributed at short intervals over the entire voice band and can therefore not be canceled by way of filters. Such quantization noises become noticeable in a particularly disturbing manner with signals having a sinusoidal waveform as represented by audible tones. Avoiding such disruptions, in that only audible tones whose frequency is a subharmonic of the sampling frequency are generated, can only be poorly achieved in view of the signaling requirements to be met, and added thereto is the fact that the generation of the audible tones advantageously occurs with the assistance of digital tone generators which emit amplitude values stored in coded form as a pulse code modulation (PCM) word with a cyclic repetition, the plurality of the amplitude values being a power of two for economic reasons.

The frequency of the tones thereby generated is determined by jumping a suitable plurality of stored PCM words. Derived therefrom, however, is that any desired frequencies and any desired subharmonics of the sampling frequency cannot be generated with such tone generators.

SUMMARY OF THE INVENTION

The object of the present invention, therefore, is to provide a method by which the disruptive influence of quantization noises on sinusoidal audible tones transmitted in digital exchange systems can at least be reduced.

The above object is achieved, according to the present invention, in that an upper harmonic wave tone with a significantly lower amplitude, in comparison to the audible tone amplitude, is additively superimposed on the audible tone.

BRIEF DESCRIPTION OF THE DRAWING

The Figure shows a digital exchange using the invention.

DESCRIPTION OF THE PREFERRED EMBODIMENTS

The realization of the invention is based on the perception that, due to the frequency dependency of the radiation characteristics of the receivers of subscriber sets, noise components appearing at frequencies of more than 1 kHz are emitted with a relatively high power therefore. A harmonic tone of an audible tone which lies in this frequency range can therefore drown out the quantization noises, even at a relatively low level, but is not itself subjectively considered to be a disruptive noise because of its frequency relation to the audible tone.

According to a particular embodiment of the invention, the fifth harmonic tone having a frequency of 2125 Hz is superimposed in conjunction with a sinusoidal audible tone of 425 Hz which is employed as a dial tone in the telecommunications network of the German Post Office, this lying both in the range of greatest sensitivity of hearing and in the range of high efficiency of the subset receiver of the group switches. A relationship of the audible tone amplitude to the harmonic tone amplitude of −30 dB has thereby proven favorable.

It should be taken into consideration in the selection of the harmonic tone to be superimposed that this dare not influence pushbutton frequency receivers provided under given conditions, i.e. must lie above the frequency range in which such receivers respond. This is the case given the aforementioned, fifth harmonic tone of the sinusoidal tone of 425 Hz.

As already set forth above, the method of the invention is preferably to be employed when the audible tones are generated with the assistance of a digital tone generator. The digital tone generator is then equipped and operated such that it also separately generates the appertaining harmonic tones and additively superimposes the same on the fundamental tone.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for transmitting an audible tone in a digital telecommunications system wherein the audible tone includes quantization noise which is disruptive of the audible tone, the improvement comprising the steps of:

generating an audible tone which includes quantization noise;

separately generating a harmonic tone of the audible tone at an amplitude significantly lower than the amplitude of the audible tone and sufficient high to mask said quantization noise; and additively superimposing the separately generated harmonic tone on the audible tone for transmission therewith.

2. The method of claim 1 for use in a system having multifrequency signal receivers having a frequency range, and wherein the step of separately generating a harmonic tone is further defined by:

generating said harmonic tone of the audible tone at a frequency above the frequency range of said multi frequency receivers.

3. A method as claimed in claim 1, wherein the step of generating an audible tone is further defined by the step of:

generating said audible tone at a frequency of approximately 425 Hz; and wherein the step of separately generating a harmonic tone is further defined by:

generating said harmonic tone of the audible tone at approximately 2125 Hz.

4. A method as claimed in claim 1, wherein the step of separately generating a harmonic tone is further defined by:

generating said harmonic tone of the audible tone at a level approximately 30 db below the level of said audible tone.

* * * * *